United States Patent
Lewis et al.

(10) Patent No.: US 9,189,248 B2
(45) Date of Patent: Nov. 17, 2015

(54) SPECIALIZED BOOT PATH FOR SPEEDING UP RESUME FROM SLEEP STATE

(71) Applicant: Insyde Software Corp., Taipei (TW)

(72) Inventors: Timothy A. Lewis, El Dorado Hills, CA (US); Jinson Tsai, New Taipei (TW); Derek Hsu, New Taipei (TW)

(73) Assignee: Insyde Software Corp., Taipei (TW)

( * ) Notice: Subject to any disclaimer, the term of this patent is extended or adjusted under 35 U.S.C. 154(b) by 256 days.

(21) Appl. No.: 14/016,995

(22) Filed: Sep. 3, 2013

(65) Prior Publication Data

US 2014/0325197 A1  Oct. 30, 2014

Related U.S. Application Data

(60) Provisional application No. 61/816,105, filed on Apr. 25, 2013.

(51) Int. Cl.
| | |
|---|---|
| *G06F 1/00* | (2006.01) |
| *G06F 9/00* | (2006.01) |
| *G06F 9/24* | (2006.01) |
| *G06F 15/177* | (2006.01) |
| *G06F 9/44* | (2006.01) |

(52) U.S. Cl.
CPC .................................. *G06F 9/4418* (2013.01)

(58) Field of Classification Search
CPC .................................................... G06F 9/4418
USPC ........................................ 713/1, 2, 300, 320
See application file for complete search history.

(56) References Cited

U.S. PATENT DOCUMENTS

| | | | |
|---|---|---|---|
| 6,694,451 B2 * | 2/2004 | Atkinson | 714/15 |
| 7,546,447 B2 * | 6/2009 | Chen et al. | 713/1 |
| 2003/0070065 A1 * | 4/2003 | Fleming | 713/2 |
| 2008/0222423 A1 * | 9/2008 | Rodriguez et al. | 713/182 |
| 2010/0169631 A1 * | 7/2010 | Yao et al. | 713/2 |

* cited by examiner

*Primary Examiner* — Mark Connolly
(74) *Attorney, Agent, or Firm* — McCarter & English, LLP; John S. Curran

(57) ABSTRACT

A specialized boot path for speeding up resume from a sleep state is discussed. In a UEFI-compliant system, a specially constructed alternate firmware volume is created which contains only the code modules used during resumption from an S3 sleep state. This alternate firmware volume is copied into Random Access Memory (RAM) during a normal boot. When the system subsequently enters the S3 sleep state and then begins the resume boot process, code in the boot sequence detects it is a resume from an S3 sleep state, restores a RAM configuration and jumps execution to a Pre-EFI Initialization (PEI) core entry point in the alternate firmware volume in RAM instead of to a firmware volume in ROM. This alternate firmware volume performs specified S3 resume tasks and then returns control to the operating system.

22 Claims, 5 Drawing Sheets

US 9,189,248 B2

SPECIALIZED BOOT PATH FOR SPEEDING UP RESUME FROM SLEEP STATE

RELATED APPLICATION

This application is related to, and claims the benefit of, U.S. Provisional Patent Application No. 61/816,105, entitled "Specialized Boot Path for Speeding Up Resume From Sleep State", filed Apr. 25, 2013, the contents of which are incorporated herein by reference in their entirety.

BACKGROUND

Computing devices are initialized by firmware included within the device and this firmware provides a range of software services which facilitate the boot of the operating system (OS) as well as providing a smaller subset of these services that continue to be available after the operating system has booted. Firmware is software that has been written onto Read-Only Memory (ROM) modules including, but not limited to, ROM, PROM, EPROM, EEPROM, and Flash memory (collectively referred to hereafter as "ROM"). Among other services, the firmware is responsible for operation of the computing device until a boot process can be run which loads an operating system for the computing device into memory. Once loaded, the operating system is in charge of normal operation of the computing device although the provision of certain services after loading of the operating system may require a transition of control from the operating system back to the firmware for security and other reasons.

Unified Extensible Firmware Interface (UEFI) is a specification created by a non-profit industry body detailing a programming interface between the Operating System and the included firmware of a computing device such as, but not limited to, a Personal Computer (PC). UEFI specifications describe a set of tools by which a computing device can move in an organized fashion from the power-applied state to fully operational. The UEFI specification tells the desired result but deliberately does not specify the internal tactic of implementation. The UEFI firmware specification replaces earlier OS/firmware interfaces previously used by the industry and commonly known as legacy BIOS.

When implemented in a computing device, the machine codes for UEFI firmware and all permanent data used by the firmware reside in ROM. In many cases the ROM is an Electrically Erasable silicon device known as a flash ROM. Flash ROM has the characteristic that it can be erased by electrical command and individual elements may then be written and the device will retain the data indefinitely. When power is first applied to the computing device, the system executes a process called reset which clears the state to a known condition and begins execution of the firmware. The firmware is read from the flash ROM or other ROM in the computing device.

BRIEF SUMMARY

An embodiment of the present invention provides a specialized boot path for speeding up a computing device's resume from a sleep state. In a UEFI-compliant computing device, a specially constructed alternate firmware volume is created which contains only the code modules needed during resumption from an Advanced Configuration and Power Interface (ACPI) S3 sleep state. This alternate firmware volume is copied into Random Access Memory (RAM) during a normal boot sequence. When the system subsequently enters the S3 sleep state, the system resumes execution by beginning a second boot process when a wake event is detected. Firmware code in the Security (SEC) phase of the boot process detects that system execution is now resuming from an S3 sleep state. Based on the detection, a previously saved RAM configuration is restored and an address of the alternate firmware volume that was previously recorded is retrieved. Firmware code then diverts execution of the resume boot sequence to a Pre-EFI Initialization (PEI) core entry point in the alternate firmware volume instead of to the regular firmware volume in flash memory. This alternate firmware volume may perform a reduced and/or optimized set of resume tasks and then return control of the computing device back over to the operating system. The use of the alternate firmware volume holding a reduced and/or optimized set of firmware modules in RAM by the present invention speeds up the time required to resume execution from an S3 sleep state as compared to conventional techniques that execute a full set of non-optimized firmware modules from a flash ROM part.

In one embodiment a computing device-implemented method includes performing a first boot sequence for the computing device. The method copies an alternate firmware volume that contains firmware modules needed during an S3 sleep state resume sequence into Random Access Memory (RAM). The method also stores RAM configuration information in non-volatile memory for the computing device. Subsequent to the completion of the first boot sequence the computing device enters an S3 sleep state. Execution of the computing device after entering the S3 sleep state is resumed by beginning a second boot sequence in response to detection of a wake event. Firmware code detects that the second boot sequence is a resumption from the S3 sleep state and restores the RAM configuration. The method also retrieves a previously recorded address of the alternate firmware volume which was recorded prior to the computing device completing the entering of the S3 sleep state. Execution in the second boot sequence is diverted to a Pre-Extensible Firmware Interface Initialization (PEI) core entry point in that alternate firmware volume in RAM using the retrieved address prior to the computing device resuming an operating mode controlled by an operating system.

In another embodiment, a computing device includes Random Access Memory (RAM), Read Only Memory (ROM), a central processing unit (CPU), and firmware code stored in ROM. The firmware code performs a first boot sequence for the computing device, copies an alternate firmware volume containing firmware modules needed during an S3 sleep state resume sequence into RAM and stores in a non-volatile memory a RAM configuration for the computing device that includes an address in RAM of the copied alternate firmware volume. After the computing device subsequently enters an S3 sleep state following the completion of the first boot sequence, and then begins a second boot sequence due to a wake event, firmware code begins execution at the reset vector for the CPU, detects that the second boot sequence is a resumption from the S3 sleep state, and restores the RAM configuration. A previously recorded address of the alternate firmware volume is also retrieved, the address recorded prior to the computing device completing the entering of the S3 sleep state. The firmware code also diverts the execution of the second boot sequence to a Pre-Extensible Firmware Interface Initialization (PEI) core entry point in the alternate firmware volume in RAM using the retrieved address prior to the computing device resuming an operating mode controlled by an operating system.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Figure 1:
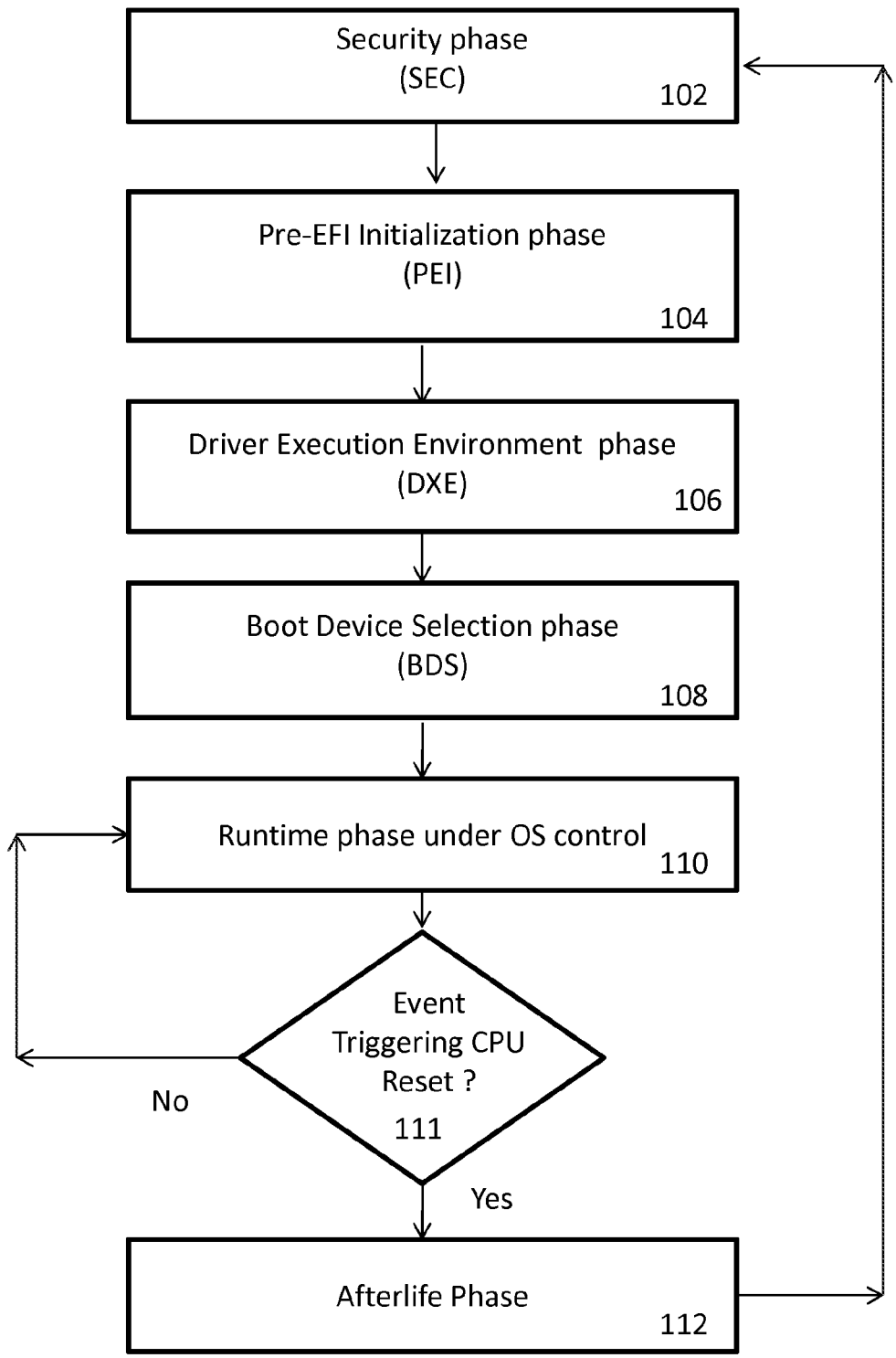
FIG. 1 depicts an exemplary boot flow consistent with the UEFI Platform Initialization Specification.

The Advanced Configuration and Power Interface (ACPI) specification defines a standard for device configuration and power management to be implemented by the operating system (OS) in computing devices. As part of its power management standard, the ACPI specification defines six basic system power states or "sleep-states" ranging from S0 (on) to S5 (off). The sleep-states describe gradually greater degrees of power savings and greater lengths of time needed to make the system available to a user. For example a computing device in an S3 power state is saving more power than a computing device in an S1 state while a system in an S5 state requires more time to respond to a user input command than a system in an S3 power state. In an ACPI-compliant computing device, an operating system controls the transition of the computing device between sleep-states by writing a specific "sleep value" to a sleep register.

The six sleep-states defined by the ACPI specification are:
S0: On (not sleeping)
S1: The S1 sleeping state is a low wake latency sleeping state. In this state, no system context is lost (CPU or chipset) and hardware maintains all system context.
S2: The S2 sleeping state is a low wake latency sleeping state. This state is similar to the S1 sleeping state except that the CPU and system cache context is lost (the OS is responsible for maintaining the caches and CPU context). Control starts from the processor's reset vector after the wake event.
S3: The S3 sleeping state is a low wake latency sleeping state where all system context is lost except system memory. CPU, cache, and chipset context are lost in this state. Hardware maintains memory context and restores some CPU and L2 cache configuration context. Control starts from the processor's reset vector after the wake event.
S4: The S4 sleeping state is the lowest power, longest wake latency sleeping state supported by ACPI. In order to reduce power to a minimum, it is assumed that the hardware platform has powered off all devices. Platform context is maintained.
S5: Soft Off State. The S5 state is similar to the S4 state except that the OS does not save any context. The system is in the "soft" off state and requires a complete boot when it wakes. Software uses a different state value to distinguish between the S5 state and the S4 state to allow for initial boot operations within the BIOS to distinguish whether or not the boot is going to wake from a saved memory image.

In an ACPI-compliant computing device a "sleep control register" is an I/O register defined in a Fixed ACPI Description Table (FADT). A FADT is an ACPI-defined table which describes a number of fixed hardware resources, including a Sleep Control Register. The ACPI specification defines two different types of sleep control registers: PM1 Control (section 4.8.1) and Sleep Control (section 4.8.3.7). The former is used when the system is not classified as hardware-reduced (see HW_REDUCED_ACPI, table 5-35) and the latter is used when the system is classified as hardware-reduced. Conventionally, in order to trigger a sleep-state transition, the operating system checks the address of a sleep control register defined in the FADT and writes a sleep type value associated with a desired sleep-state to the address.

The UEFI Platform Initialization Specification defines a typical boot flow process engaged in by Platform Initialization (PI) firmware to boot a UEFI-compliant computing device. A typical boot code flow in PI firmware passes through a succession of phases, in the following order:
1. Security (SEC) phase;
2. Pre-EFI Initialization (PEI) phase;
3. Driver Execution Environment (DXE) phase;
4. Boot Device Selection (BDS) phase;
5. Runtime phase;
6. Afterlife (AL) phase.

FIG. 1 depicts an exemplary boot sequence consistent with the UEFI Platform Initialization Specification. The exemplary boot sequence begins execution at the CPU reset vector with the SEC phase firmware beginning execution (step 102). The CPU reset vector is the default location from which the CPU will retrieve the first instruction for execution following a CPU reset. The SEC phase extends from the time of CPU reset until temporary RAM is available. Among other duties, the SEC phase handles platform restart events, creates a temporary memory store, for example by using processor cache as flat memory, and hands pointers to the temporary memory, temporary stack and a Boot Firmware Volume (BFV) to the PEI phase. The PEI phase (step 104) initializes memory for the DXE phase to start using drivers known as PEI modules (PEIM) which are contained in the BFV provided by the SEC phase. The final module executed in the PEI phase, called the driver execution environment initial program loader (DXE IPL) or (DXE Initial Program Load) transitions operation to the DXE phase. The DXE phase (step 106) initializes the system components such as chipsets and add-on cards. The BDS selection phase (step 108) selects a boot device from which to load an operating system. The runtime phase (step 110) refers to the time following completion of a boot sequence when the operating system has been loaded into memory and taken control of the computing device. The AL phase (step 112) occurs when the computing device's firmware takes control back from the operating system after the operating system has shut down, for example as a result of a transition by the computing device to a low power state (step 111) such as a sleep state, and before a CPU reset occurs.

A conventional method for an S3 resume boot sequence has been to use the same firmware volume for both a normal boot and the case of an S3 resume boot. In both of these boot cases, execution begins at the CPU reset vector, proceeds through the Security (SEC) phase, enters the Pre-EFI Initialization (PEI) core, processes all the PEI modules and then jumps to an exit point provided by the DXE IPL module. The DXE IPL module continues to the DXE phase in the case of a normal boot, but if an S3 resume has been detected, the module diverts execution down an alternate path to continue restoring system configuration, process an alternate set of firmware modules and jump to the ACPI waking vector.

Previous attempts to speed up this conventional S3 resume process have revolved around two types of optimization. The first type of optimization takes advantage of the fact that, before entering the S3 resume boot path, the system must have initially booted up by using the "normal" (non-sleep state resume) boot path. During the normal boot path, the PEI modules often have two tasks: 1) to discover the devices installed and their preferred configuration; and then 2) to program the device with the preferred configuration. Some conventional approaches have attempted to optimize the S3 resume path by caching the preferred configuration during normal boot. This allows the S3 resume boot path to skip the "discover" step and use the cached data for the "program" step, thus saving valuable time.

A second type of optimization relies on capabilities of the PEI dispatcher to a) defer execution of PEI modules; and b) find PEI modules in more than one firmware volume. First, the PEI modules can be built so that they are not scheduled for execution unless their dependency expression is satisfied. The dependency expression contains lists of PPIs (interfaces) which must have been published before the PEI module will be scheduled for execution. During the S3 resume boot path, for example, a PPI is published to mark that boot mode. Drivers that are specific to the S3 resume path (or another boot path, like crisis recovery) can list that PPI in their dependency expression. Second, a PEI module or the SEC can expose a second, supplementary firmware volume only when in a certain boot mode. So, for example, the main firmware volume could contain only the PEI modules required for S3 resume, but expose a secondary volume that contains the additional modules required for a normal boot.

Embodiments of the present invention provide advantages over both of the above discussed techniques by speeding up resume time by loading an alternate firmware volume into RAM that is used only on the S3 resume path. By using an alternate firmware volume, a minimum or reduced number of PEI modules may be executed on the S3 resume path. Execution speed is increased due to reduction in overhead related to processing fewer modules and their associated dependency expressions. By using RAM, execution speed is increased significantly by spending as little time as possible executing from ROM since execution of code from a flash device or other type of ROM is significantly slower than execution of code from RAM. Further, by using a dedicated set of code for the S3 resume path, alternate versions of some modules (such as the PEI Core and DXE IPL) can be created that optimize for the S3 resume case.

Figure 2:
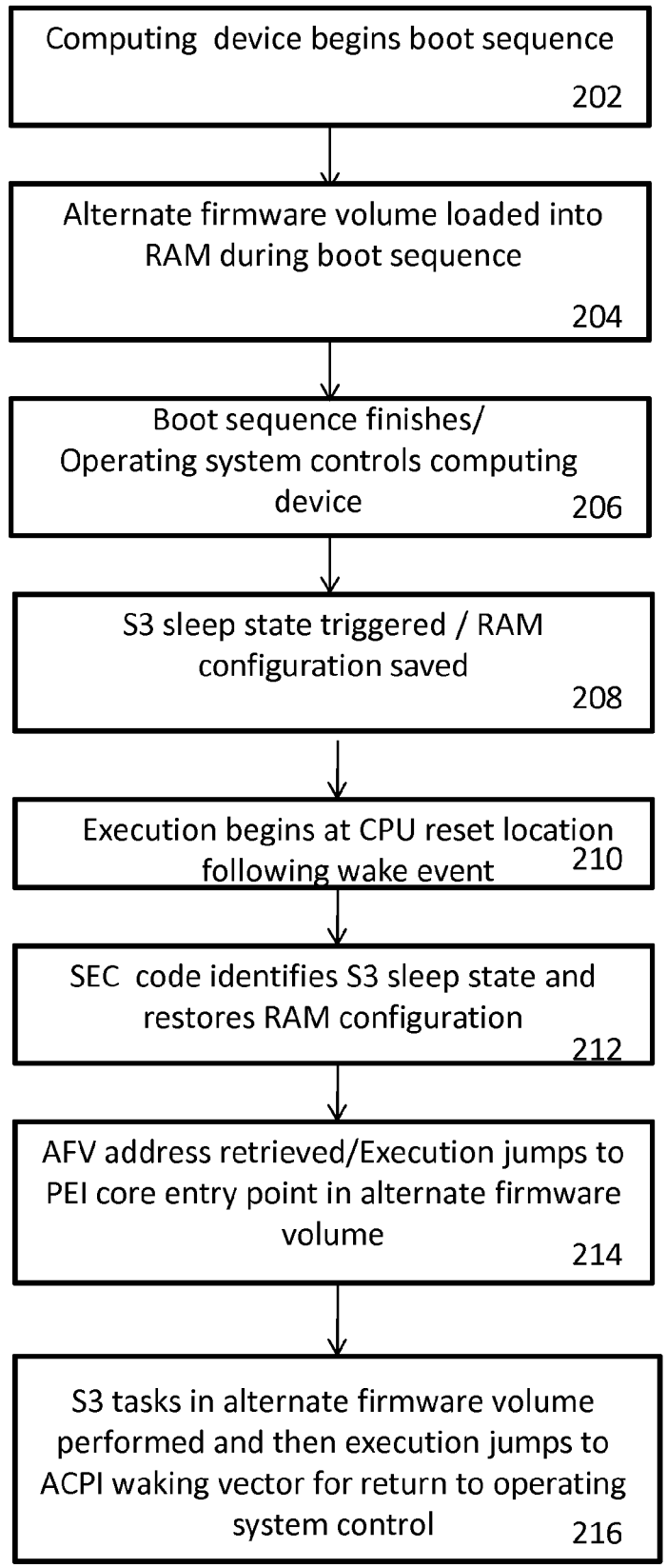
FIG. 2 depicts an exemplary sequence of steps performed an embodiment of the present invention to resume execution from an S3 sleep state using an alternate firmware volume stored in RAM.

FIG. 2 depicts an exemplary sequence of steps performed by an embodiment of the present invention to resume execution from an S3 sleep state using an alternate firmware volume stored in RAM. The overall sequence begins with a first boot sequence beginning (step 202). During the first boot sequence, an alternate firmware volume is loaded into RAM (step 204). This alternate firmware volume may be customized to contain only firmware volumes needed for an S3 resume process. Alternatively, the alternate firmware volume may contain alternate versions of some modules used in an S3 resume boot sequence. In another embodiment, the alternate firmware volume will be identical to a firmware volume stored in ROM. In such a case, the benefit from the use of the alternate firmware volume would be only the faster execution time resulting from executing firmware code from RAM versus ROM. When the first boot sequence completes, the operating system for the computing device has been loaded into memory and is controlling the operations of the computing device (step 206).

Subsequently, during a normal operation mode that is under control of the operating system, an event occurs that triggers a transition to an S3 sleep state and the RAM configuration is saved by storing it in non-volatile memory (step 208). The transition to an S3 state may be the result of a user command or may be triggered automatically as the result of an event in the operating environment. The saved RAM configuration is data which is recorded about a RAM device's configuration and the memory controller's configuration in order to restore the RAM device to a fully working condition when resuming from the S3 power state. In order for S3 to work, the information concerning the number and type of RAM devices, along with other similar information (the "RAM configuration") is saved by the firmware. This information is saved because the CPU and memory controller enter a low-power state during a sleep state where some or all of this information is lost. In some cases, the act of rediscovering this RAM configuration information causes loss of data in RAM devices that were placed in a low-power state, or would exceed the amount of time desirable when resuming from the S3 state. The firmware saves some or all of this information to aid the reliable and speedy restoration of the RAM devices to a fully working state. This saving of information may be done during the initial boot. Alternatively the information may be saved in System Management Mode (SMM) in AL phase (after SLP_EN was written to transition the system to a sleep state). SMM is discussed further below. In one embodiment, code executing in the SEC phase uses this information to restore the RAM devices to a fully working state. In another embodiment, code executing in the PEI phase uses this information to restore the RAM devices to a fully working state.

In addition to the RAM configuration, the embodiments of the present invention also record an address of the alternate firmware volume prior to completing the transition of the computing system into the S3 sleep state. In the case where the address of the alternate firmware volume is not fixed (during the construction of the firmware), the address in RAM to which the alternate firmware volume is copied is stored so that the SEC (or other firmware) code knows the location of the alternate firmware volume. The address can be recorded in RAM (in which case it is retrieved after RAM is restored) or the address can be recorded in flash memory. Regardless of where the address is stored, it is recorded prior to the system fully entering into the S3 sleep state.

Following the transition to the S3 sleep state, execution for the computing device begins again at the CPU reset location following a wake event (step 210). Wake events are system events which cause a transition of a computer system from a sleeping state to an execution state and are defined in the ACPI specification. For example, input received from a keyboard, a mouse, USB device, or a message received over a local area network (LAN) or another defined type of event during an S3 sleep state may be a wake event that causes the beginning of execution at the CPU reset location. Following the wake event, SEC code identifies the resumed execution as part of a resume boot from an S3 sleep state and restores the previously stored RAM configuration (step 212). The previous sleep state can be detected in a number of ways, including by examining registers within the hardware. Additionally, during the resume boot sequence, the firmware code retrieves the fixed or recorded address of the alternate firmware volume. The SEC firmware code of the present invention jumps execution to the PEI core entry point in the alternate firmware volume in RAM using the saved memory address (step 214). Any specified S3 tasks in the alternate firmware volume are performed and then execution jumps to the ACPI waking vector for a return to operating system control of the computing device (step 216).

Figure 3:
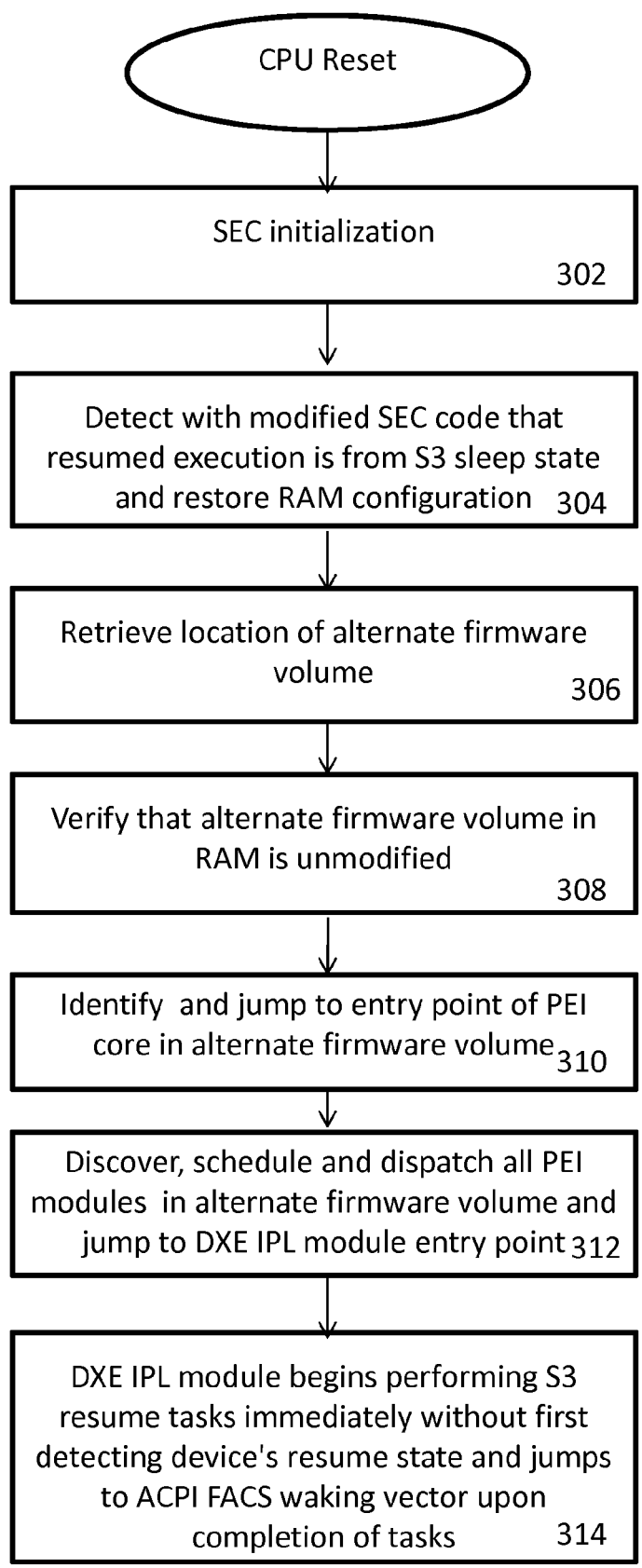
FIG. 3 depicts an exemplary sequence of steps performed by an embodiment of the present invention to identify, verify and execute an alternate firmware volume.

As discussed above, the transition to an S3 sleep state causes a reset of the computing device and the beginning of execution from the CPU reset vector. FIG. 3 depicts an exemplary sequence of steps performed by an embodiment of the present invention to identify, verify and execute an alternate firmware volume that commences with the CPU reset. As discussed above, a transition to an S3 sleep state causes the CPU to begin execution at the CPU reset vector. This marks the beginning of the SEC phase as described in the UEFI Platform Initialization specification. During this phase, the SEC code sets up the CPU execution environment for the PEI phase. This includes preparing the temporary RAM and locating the Boot Firmware Volume (BFV). It also performs any critical initialization, such as loading microcode updates for stable CPU operation (step 302). In an embodiment of the present invention, the modified SEC code detects whether the resumed execution is from an S3 sleep state and if so restores a RAM configuration for the computing device to be functionally equivalent to its configuration prior to S3 sleep (step 304). The firmware code of the present invention also detects the location of the alternate firmware volume in RAM (the alternate firmware volume having been copied and saved during a previous normal boot as noted above) (step 306). The location of the firmware volume in RAM may be fixed (i.e. always the same location and therefore known in advance to the firmware code) or a record or reference to the location of the alternate firmware volume may have been stored in RAM or non-volatile storage such as an EFI variable following the copying of the alternate firmware volume into RAM from which it is retrieved by the firmware. As will be discussed further below with respect to FIG. 4, the SEC firmware code of the present invention also checks to make sure that the alternate firmware volume that is stored in RAM has not been modified after it was copied into RAM (step 308). Once the alternate firmware volume had been verified as unmodified, the firmware code identifies and jumps execution to an entry point in the PEI core of the alternate firmware volume (step 310). Following entry to the PEI core, all of the PEI modules in the alternate firmware volume are discovered, identified and dispatched and execution then jumps to the entry point for the DXE IPL module in the alternate firmware volume (step 312). The DXE IPL module of the alternate firmware volume is able to begin performing S3 tasks immediately without first detecting the computing device's resume state since it is only used during an S3 resume (in contrast to a boot sequence for a conventional S3 resume in which the DXE IPL first has the responsibility of checking the resume state before beginning the S3 tasks). Upon completion of the S3 resume tasks, execution jumps to the ACPI waking vector and control is returned to the operating system.

Figure 4:
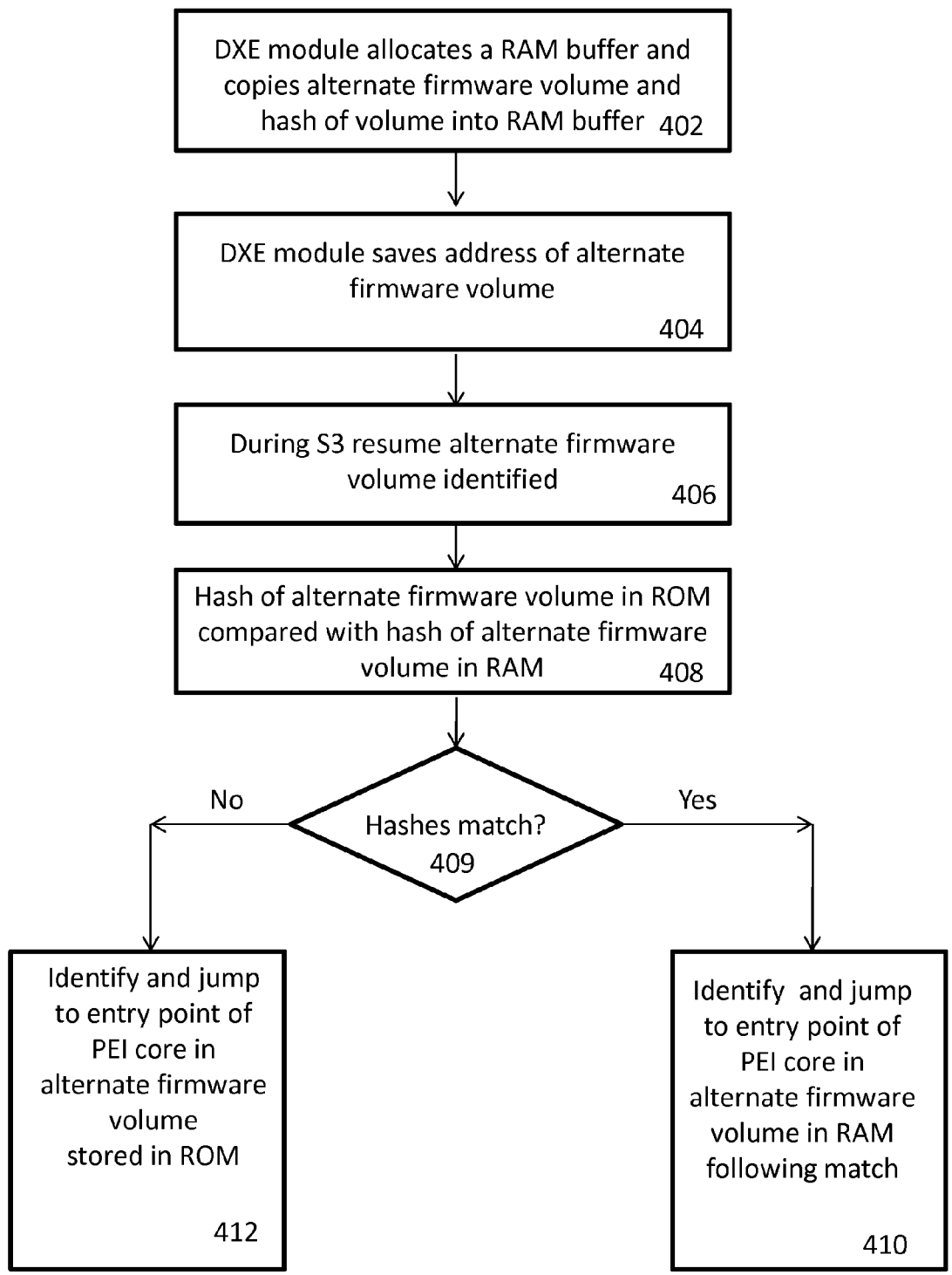
FIG. 4 depicts an exemplary sequence of steps performed by an embodiment of the present invention to verify that the alternate firmware volume stored in RAM is unmodified.

As discussed above, the copied alternate firmware volume that was stored in RAM must be verified by the firmware prior to execution since it is possible that it may have been modified during or after storage. FIG. 4 depicts an exemplary sequence of steps performed by an embodiment of the present invention to verify that the alternate firmware volume stored in RAM is unmodified. The process by which the alternate firmware volume is verified begins prior to the S3 sleep state during a normal (non-S3, non crisis-recovery boot). During the normal boot sequence that occurs before a subsequent transition to an S3 sleep state, a DXE module of the present invention finds an S3 resume alternate firmware volume in ROM, allocates a RAM buffer of equivalent size and copies the S3 resume firmware volume into that RAM buffer. In one embodiment, a hash of that copied alternate firmware volume is included within the alternate firmware volume's data structure or in some other pre-defined location in flash ROM. The hash may be calculated at the time when the alternate firmware volume is created from the constituent firmware modules at build time. Alternately, no hash is calculated at build-time but rather is calculated later and stored in a location that cannot be tampered with by OS software. The DXE module saves the address of the alternate firmware volume so that it can be retrieved during a subsequent S3 sleep/resume sequence by the firmware of the present invention (step 404). It will be appreciated that if the implementation utilizes a fixed location for copying the alternate firmware volume into RAM, the saving of the location information is unnecessary. During a subsequent S3 resume boot sequence, the alternate firmware volume is identified (step 406) and the hash of the alternate firmware volume in RAM is compared with a hash of the original alternate firmware volume stored in ROM (step 408). As noted above, the hash of the alternate firmware volume stored in ROM may be made at the time of the comparison, or may have been previously calculated and stored during the first boot, while entering the S3 sleep state or during the build process. Similarly, the hash of the alternate firmware volume stored in RAM may also be made at the time of comparison instead of having been previously calculated and stored as part of the alternate firmware volume. If the hashes match (step 409), the alternate firmware volume in RAM has not been modified and execution jumps to the entry point of the PEI core in the alternate firmware volume in RAM (step 410). If the hashes do not match (step 409), the alternate firmware volume in RAM has been modified and can no longer be trusted. In that case, execution may proceed by using the original alternate firmware volume stored in ROM (albeit with a slower execution speed) (step 412). Alternatively, in the case of an error, implementations may halt the S3 resume boot sequence by generating an error message or taking some other previously specified action.

In another embodiment an identical firmware volume may be used for both the normal and S3 resume execution path with the difference being that that S3 resume uses a RAM copy of the firmware volume. This gives the speed advantage of RAM and a smaller ROM footprint. However, this embodiment does not allow for leaving out PEI modules not used in the S3 resume boot path, or the creation of a specialized version of any of the modules, like DXE IPL.

In a further embodiment, the copying of the alternate firmware volume into RAM described above could take place in System Management Mode (SMM), so that the copy is created during the S3 sleep process rather than during an earlier normal boot sequence. Many CPUs have a normal operating mode and a second operating mode called System Management Mode (SMM). When the CPU is in normal operating mode it can access all elements of the computer except certain memory regions exclusively dedicated to SMM mode. In contrast, when the CPU is operating in SMM mode it is able to access all elements of the computing device including the dedicated memory. The CPU may be directed to transition from normal operating mode to SMM by a number of triggers called System Manage Interrupt (SMI) events including SMI events triggered by firmware. The triggering of an SMI event suspends execution in main memory and execution resumes at a specific location in SMM memory. Many chipsets provide an option so that when the SLP_EN bit is set, instead of transitioning immediately into an S3 sleep state, the system generates a system management interrupt (SMI) and the system first transitions into SMM before performing a CPU reset.

In this alternate embodiment, after an SMI triggered transition into SMM, the copy of the alternate firmware volume may be made from the in-flash copy into the in-memory RAM buffer. This provides a benefit in that the verification step described earlier may be skipped in order to increase performance since an assumption is made that the RAM has not been tampered with while the system is in the S3 state. The disadvantage with this approach is that some types of S3 self-refresh errors cannot be corrected automatically (i.e. if an error was introduced in the low-power state) and some forms of malicious attack requiring physical access to RAM may be performed. Following the copying of the alternate firmware volume into the RAM buffer, execution can resume as described above at the CPU reset vector.

Figure 5:
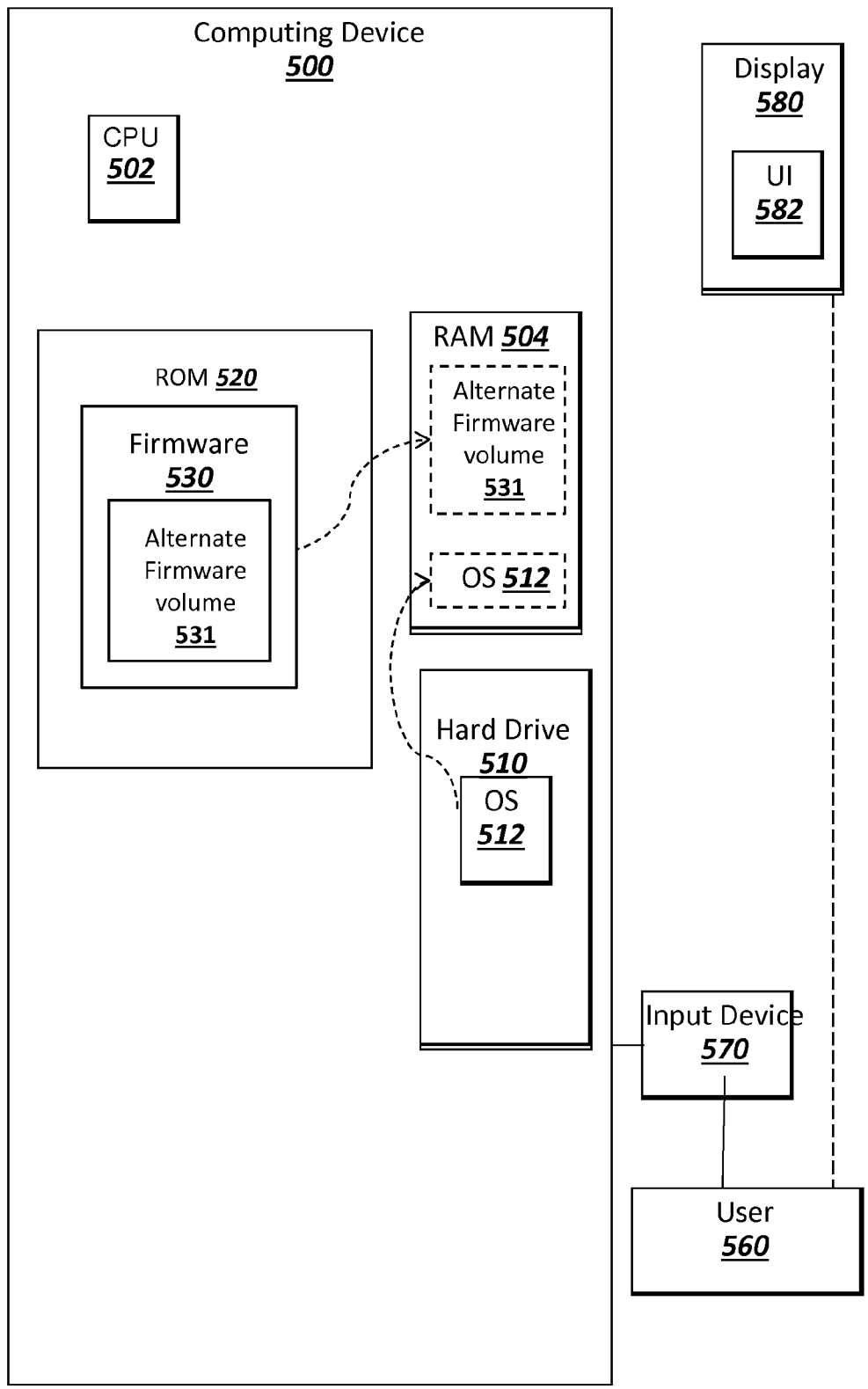
FIG. 5 depicts an exemplary environment suitable for practicing an embodiment of the present invention.

FIG. 5 depicts an exemplary environment suitable for practicing an embodiment of the present invention. An exemplary computing device 500 is equipped with a CPU 502, Random Access Memory (RAM) 504 and non-volatile storage such as a hard drive 510 or other non-volatile storage location. The hard drive 510 may store an operating system (OS) 512 that is loaded into memory 504 during a boot process. The computing device 504 may be a tablet computing device, cell phone, smart phone, PDA, laptop, netbook, desktop computer, mobile computing device or other computing device equipped with a processor. The computing device includes ROM 520. Firmware 530 resident in ROM 520 may be responsible for loading OS 512 into RAM 504 during a boot sequence. Firmware 530 may also include an alternate firmware volume 531. The alternate firmware volume 531 may be copied into RAM 504 as described above to provide for a quicker S3 resume boot sequence. Computing device 500 may also include an input device 570 accessed by a user 560. The user 560 may view a display surface or device 580 in communication with computing device 500. Display surface or device 580 may display a user interface 582.

It will be appreciated that although the description herein refers to an alternate firmware volume (singular) being loaded into RAM, more than one alternate firmware volume may be loaded into RAM without departing from the scope of the present invention.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A computing device-implemented method, comprising:
performing a first boot sequence for the computing device;
copying an alternate firmware volume containing firmware modules used during an S3 sleep state resume sequence into Random Access Memory (RAM);
storing in non-volatile memory a RAM configuration for the computing device;
entering an S3 sleep state for the computing device subsequent to the completion of the first boot sequence;
resuming execution of the computing device after entering the S3 sleep state by beginning a second boot sequence in response to detection of a wake event;
detecting that the second boot sequence is a resumption from the S3 sleep state and restoring the RAM configuration;
retrieving a previously recorded address of the alternate firmware volume, the address recorded prior to the computing device completing the entering of the S3 sleep state, and
diverting the execution of the second boot sequence to a Pre-Extensible Firmware Interface Initialization (PEI) core entry point in the alternate firmware volume in RAM using the retrieved address prior to the computing device resuming an operating mode controlled by an operating system.

2. The method of claim 1, further comprising:
matching a hash of the alternate firmware volume in RAM with a hash of the alternate firmware volume stored in ROM prior to the beginning of the execution at the PEI core entry point in the alternate firmware volume in RAM.

3. The method of claim 2, further comprising:
calculating and storing in ROM the hash of the alternate firmware volume during the first boot sequence.

4. The method of claim 2, further comprising:
calculating and storing in ROM the hash of the alternate firmware volume during a build process for the alternate firmware volume.

5. The method of claim 2, further comprising:
while copying the alternate firmware volume into RAM, calculating a hash of the alternate firmware volume being copied and storing the hash in RAM together with the copied alternate firmware volume.

6. The method of claim 1 wherein the alternate firmware volume includes a subset of less than all of a group of firmware modules used in the first boot sequence.

7. The method of claim 5 wherein at least one firmware module in the subset is optimized for a resumption from an S3 sleep state.

8. The method of claim 1 wherein the alternate firmware volume is an identical copy of the firmware volume stored in ROM.

9. The method of claim 1 wherein the alternate firmware volume is copied into RAM during the first boot sequence.

10. The method of claim 1 wherein the alternate firmware volume is copied into RAM during a transition into the S3 sleep state.

11. A non-transitory computer-readable medium holding instructions for resuming execution in a computing device from a sleep state, the instructions when executed causing the computing device to:
perform a first boot sequence for the computing device;

copy an alternate firmware volume containing firmware modules used during an S3 sleep state resume sequence into Random Access Memory (RAM);

store in non-volatile memory a RAM configuration for the computing device;

enter an S3 sleep state for the computing device subsequent to the completion of the first boot sequence;

resume execution of the computing device after entering the S3 sleep state by beginning a second boot sequence in response to detection of a wake event;

detect that the second boot sequence is a resumption from the S3 sleep state and restore the RAM configuration;

retrieve a previously recorded address of the alternate firmware volume, the address recorded prior to the computing device completing the entering of the S3 sleep state, and divert the execution of the second boot sequence to a Pre-Extensible Firmware Interface Initialization (PEI) core entry point in the alternate firmware volume in RAM using the retrieved address prior to the computing device resuming an operating mode controlled by an operating system.

12. The medium of claim 11 wherein the instructions when executed further cause the computing device to:

match a hash of the alternate firmware volume in RAM with a hash of the alternate firmware volume stored in ROM prior to the beginning of the execution at the PEI core entry point in the alternate firmware volume in RAM.

13. The medium of claim 12 wherein the instructions when executed further cause the computing device to:

calculate and store in ROM the hash of the alternate firmware volume during the first boot sequence.

14. The medium of claim 12 wherein the instructions when executed further cause the computing device to:

calculate and store in ROM the hash of the alternate firmware volume during a build process for the alternate firmware volume.

15. The medium of claim 12 wherein the instructions when executed further cause the computing device to:

while copying the alternate firmware volume into RAM, calculating a hash of the alternate firmware volume being copied and storing the hash in RAM together with the copied alternate firmware volume.

16. The medium of claim 11 wherein the alternate firmware volume includes a subset of less than all of a group of firmware modules used in the first boot sequence.

17. The medium of claim 16 wherein at least one firmware module in the subset is optimized for a resumption from an S3 sleep state.

18. The medium of claim 11 wherein the alternate firmware volume is an identical copy of the firmware volume stored in ROM.

19. The medium of claim 11 wherein the alternate firmware volume is copied into RAM during the first boot sequence.

20. The medium of claim 11 wherein the alternate firmware volume is copied into RAM during a transition into the S3 sleep state.

21. A computing device, comprising:
a Random Access Memory (RAM);
a Read Only Memory (ROM);
a central processing unit (CPU), and
firmware code stored in the ROM that when executed:
performs a first boot sequence for the computing device;
copies an alternate firmware volume containing firmware modules used during an S3 sleep state resume sequence into RAM;
stores in a non-volatile memory a RAM configuration for the computing device that includes an address in RAM of the copied alternate firmware volume;
wherein upon the computing device entering an S3 sleep state subsequent to the completion of the first boot sequence, the firmware code execution further:
resumes execution of the computing device by beginning a second boot sequence at a reset vector for the CPU in response to detection of a wake event;
detects that the second boot sequence is a resumption from the S3 sleep state and restores the RAM configuration;
retrieves a previously recorded address of the alternate firmware volume, the address recorded prior to the computing device completing the entering of the S3 sleep state; and
diverts the execution of the second boot sequence to a Pre-Extensible Firmware Interface Initialization (PEI) core entry point in the alternate firmware volume in RAM using the retrieved address prior to the computing device resuming an operating mode controlled by an operating system.

22. The computing device of claim 21 wherein the firmware code matches a hash of the alternate firmware volume in RAM with a hash of the alternate firmware volume stored in ROM prior to the beginning of the execution at the PEI core entry point in the alternate firmware volume in RAM.

* * * * *